(12) United States Patent
Wu

(10) Patent No.: US 6,533,199 B2
(45) Date of Patent: Mar. 18, 2003

(54) ONE-WAY PEPPER GRINDING TOOL

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 118 days.

(21) Appl. No.: 09/742,416

(22) Filed: Dec. 22, 2000

(65) Prior Publication Data
US 2002/0036247 A1 Mar. 28, 2002

(30) Foreign Application Priority Data
Sep. 27, 2000 (TW) .................................... 89216718 U

(51) Int. Cl.$^7$ ................................................ A47J 42/04
(52) U.S. Cl. .................................. 241/169.1; 241/259.1
(58) Field of Search ............................... 241/100, 168, 241/169.1, 259, 259.1

(56) References Cited
U.S. PATENT DOCUMENTS 4,343,437 A * 8/1982 Czelen ...................... 241/169.1
4,374,574 A * 2/1983 David ....................... 241/169.1
5,082,190 A * 1/1992 Chen ........................ 241/169.1

* cited by examiner

Primary Examiner—John M. Husar
(74) Attorney, Agent, or Firm—Rosenberg, Klein & Lee

(57) ABSTRACT

A one-way pepper grinding tool includes an one-way member, and a grinding assembly having an inner and an outer grinding part. The one-way member has a main body turnably received in a housing. The main body has several curved slots around a central round hole. The curved slots each has an engaging end portion in open communication with the central round hole for permitting an engaging block movably received in the slot to separably engage a ring fitted in the central round hole; the engaging blocks being biased to the engaging end portions by springs to force the ring to turn together with the main body when the main body turns in a first direction, making the inner grinding part associated with the ring turn to grind pepper. When the main body turns in an opposite direction, the engaging blocks are moved away from the ring, not able to make the ring turn, i.e. the inner grinding part will not turn relative to the outer grinding part.

5 Claims, 6 Drawing Sheets

ONE-WAY PEPPER GRINDING TOOL

BACKGROUND OF THE INVENTION

The present invention relates to a pepper grinding tool, which has an inner grinding part turnable relative to an outer grinding part to grind pepper in between, and particularly to one, of which the inner grinding part has one-way movement such that pepper can be ground relatively smoothly.

Referring to FIGS. 7 and 8, a conventional pepper grinding tool, with British Patent No. 2256378, has a pressing block 10, a toothed bar 20, a gear wheel 30, a gear cluster 301, a shaft 40, an inner grinding part 50 and an outer grinding part 60.

The pressing block 10 is depressable to move the toothed bar 20 downwards; when the pressing block 10 is released, the toothed bar 20 is biased up by an elastic member. The gear wheel 30 is connected to the toothed bar 20 and the gear cluster 301. The shaft 40 is connected to the gear cluster 301 and the inner grinding part 50 such that when the toothed bar 20 is moved up and down, the inner grinding part 50 can be turned by means of the gear wheel 30, the gear cluster 301 and the shaft 40.

The inner grinding part 50 is disposed in the outer grinding part 60 which is fixedly disposed in the pepper grinding tool.

Thus, the inner grinding part 50 can turn relative to the inner grinding part 60 to grind pepper in between.

However, the pepper grinding tool is found to have a disadvantage that the inner grinding part 50 turns in one direction when the pressing block 10 is depressed, and the other direction when the pressing block is released, making the grinding movement not relatively smooth, especially when there are big pepper granule between the grinding parts 50, 60.

SUMMARY OF THE INVENTION

Therefore, it is a main object of the present invention to provide a pepper grinding tool, of which the inner grinding part can turn relative to the outer grinding part in only one direction to make a relatively smooth grinding movement.

The pepper grinding tool of the present invention includes a housing member, a grinding assembly and a one-way member.

The housing member has an operation lever pivotably connected with it.

The grinding assembly has an inner grinding part and an outer grinding part. The outer part is fixedly received in the housing member. The inner part is turnable relative to the outer part to grind pepper in between.

The one-way member is received in the housing member, and has a turnable main body in the housing. The main body has a central round hole, and several curved slots around the central round hole; the curved slots each ha an engaging end portion in open communication with the central round hole. The curved slots each receives an engaging block biased towards the engaging end portion by a spring.

When the main body of the one-way member is turned in a first direction by means of pressing the operation lever, the engaging blocks will be moved to the engaging end portions to engage a ring fitted in the central round hole, making the ring turn together with the main body. Thus, the inner grinding part associated with the ring can turn to grind pepper.

The main body is turned back in an opposite direction by a torsional spring connected to it when the operation lever is released, not able to make the ring and the inner grinding part turn because the engaging blocks are moved away from the engaging end portions, and don't engage the ring any longer. Therefore, the inner grinding part can only be turned in the first direction to grind pepper.

BRIEF DESCRIPTION OF THE DRAWINGS

This invention will be better understood by referring to the accompanying drawings, wherein.

DESCRIPTION OF THE PREFERRED EMBODIMENT

Figure 1:
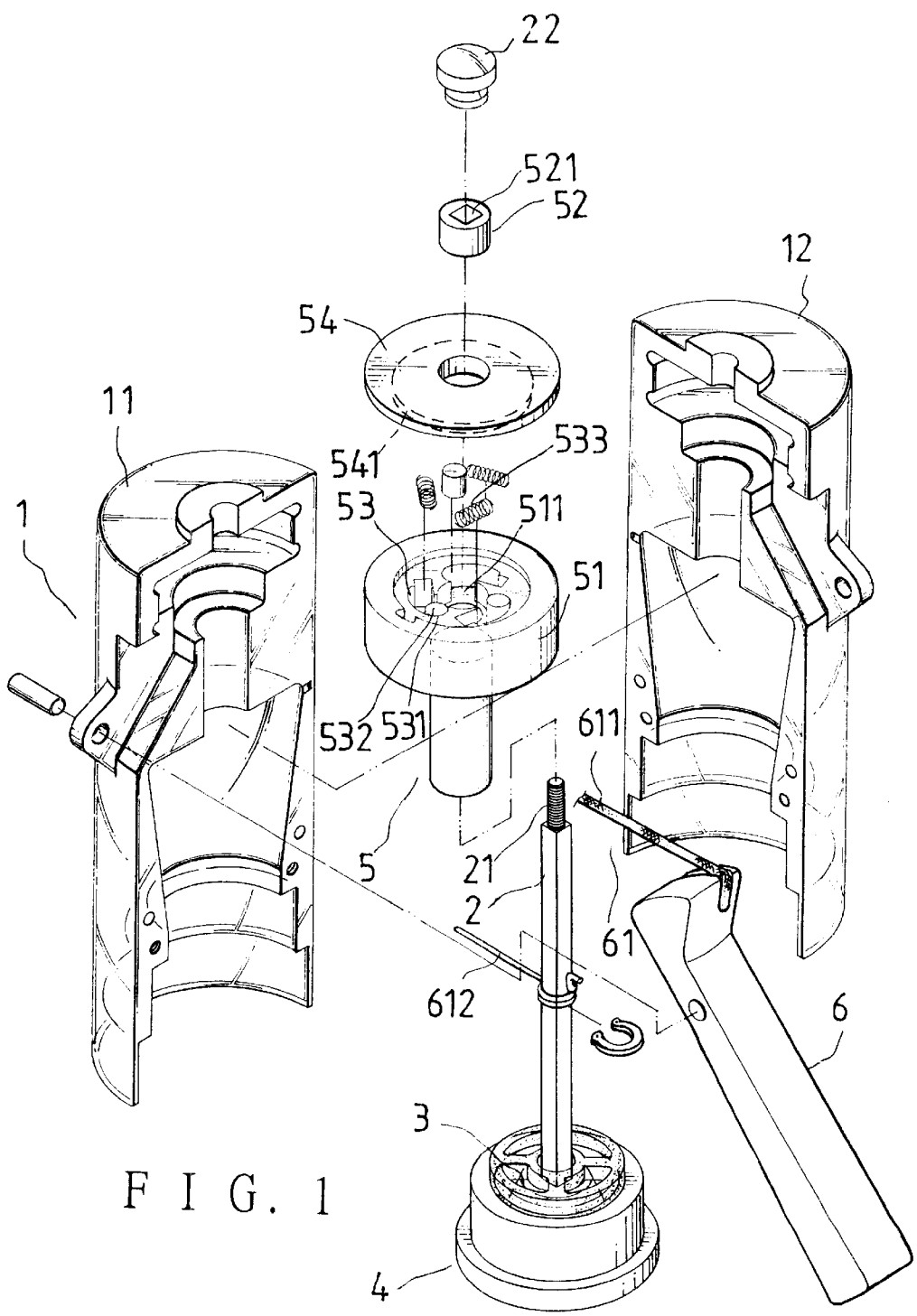
FIG. 1 is an exploded perspective view of a one-way pepper grinding tool of the present invention.
Figure 2:
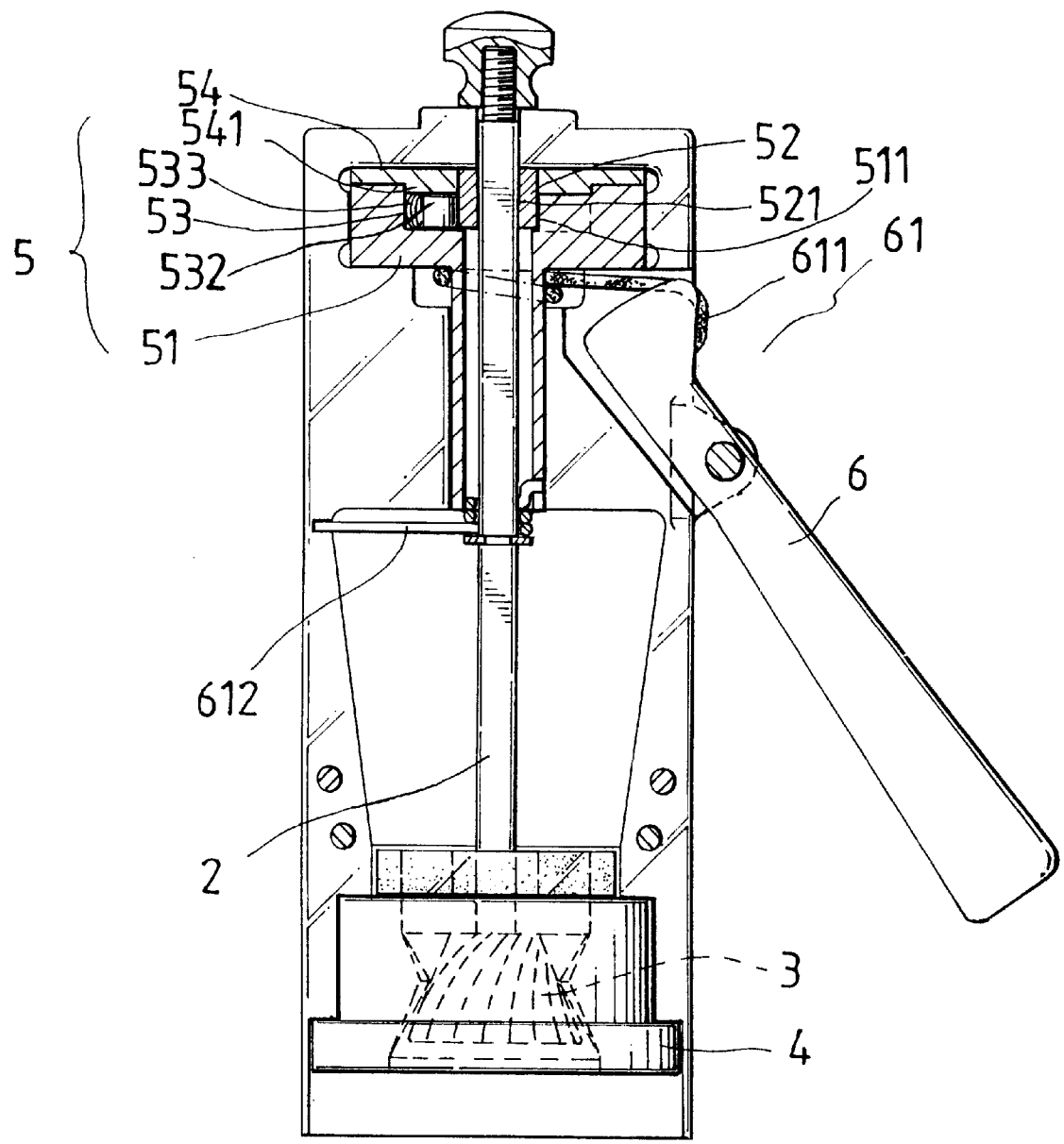
FIG. 2 is a cross-sectional view of the one-way pepper grinding tool of the present invention.
Figure 3:
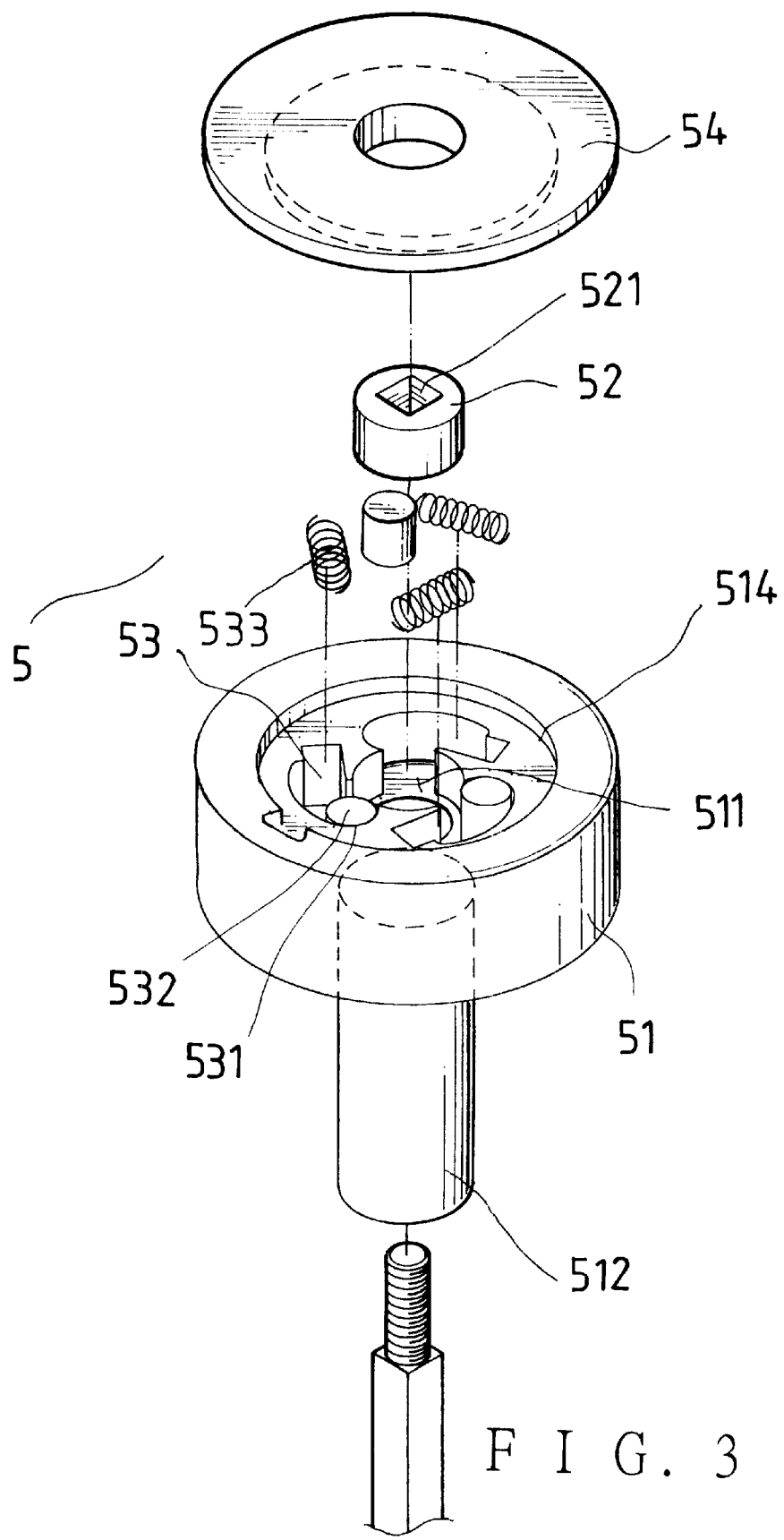
FIG. 3 is an exploded perspective view of the one-way member of the pepper grinding tool of the present invention.

Referring to FIGS. 1, 2, 3 and 4, a one-way pepper grinding tool of the present invention includes a housing member 1, a shaft 2, an inner grinding part 3, an outer grinding part 4, an one-way member 5, an operation lever 6, a string 61 and a torsional spring 612.

The housing member 1 has a left part 11 and a right part 12 forming a receiving room for the grinding parts 3, 4, the one-way member 5, the torsional spring 612, etc when combined.

The shaft 2 has a polygonal cross-section, and is connected to the inner grinding part 3 from a lower end portion. The inner grinding part 3 is turnably received in the outer grinding part 4 such that pepper can be ground in between when the inner grinding part 3 is turned.

The one-way member 5 has a round main body 51, a ring 52, a central round hole 511 and several curved slots 53 on a recessed portion of the main body 51, and a covering part 54. The round main body 51 is turnably received in the housing member 1. An upper end portion of the shaft 2 is passed through the round hole 511 of the main body 51.

Figure 4:
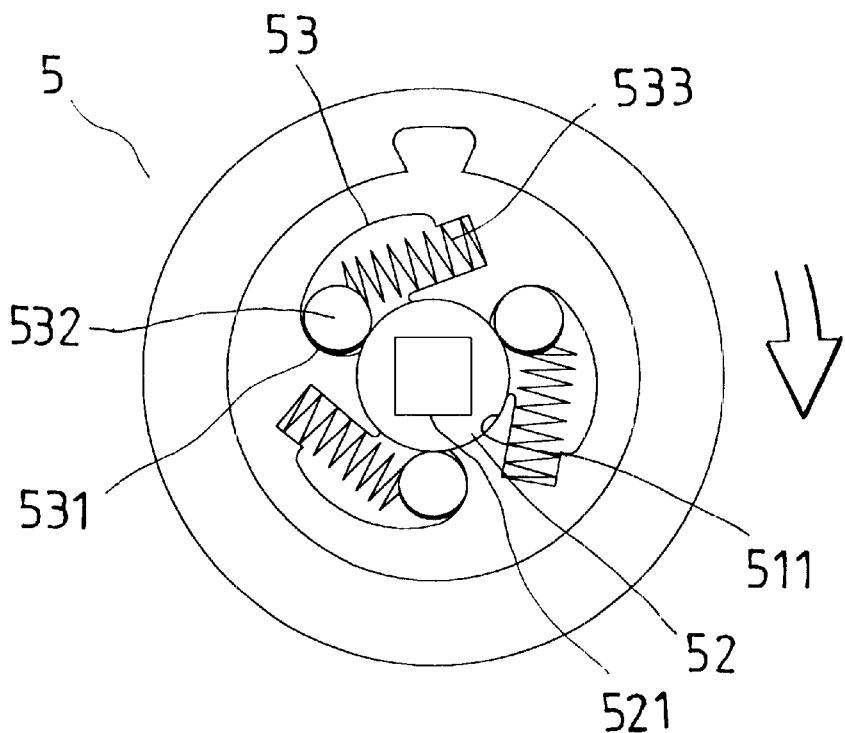
FIG. 4 is a top view of the one-way member of the pepper grinding tool according to the present invention.

The curved slots 53 each has an engaging end portion 531 and an engaging block 532 and a spring 533 received therein. The engaging end portions 531 each has an open inner portion in open communication with the central round hole 511 of the main body 51. Referring to FIG. 4, the engaging blocks 532 are each pushed into a respective one of the engaging end portions 531 by means of the spring 533.

The ring 52 has a hole 521 having a polygonal shape same as the polygonal cross-section of the shaft 2. The ring 52 is turnably received in the central round hole 511 of the one-way member 5, and abuts the engaging blocks 532 located in the engaging end portions 531 of the curved slots 53.

The covering part 54 has a central hole (not numbered) and a bottom protrusion 541. The covering part 54 is fitted onto the main body 51 with the bottom protrusion 541 secured in the recessed portion of the main body 51 to protect the engaging blocks 532 and the springs 533 from falling out. A nut 22 is connected to an upper threaded end portion 21 of the shaft 2.

The torsional spring 612 is connected to both the main body 51 of the one-way member 5 and an inner side of the housing member 1 for permitting the spring 612 to bias the main body 51 back to an original position after same is turned.

Figure 5:
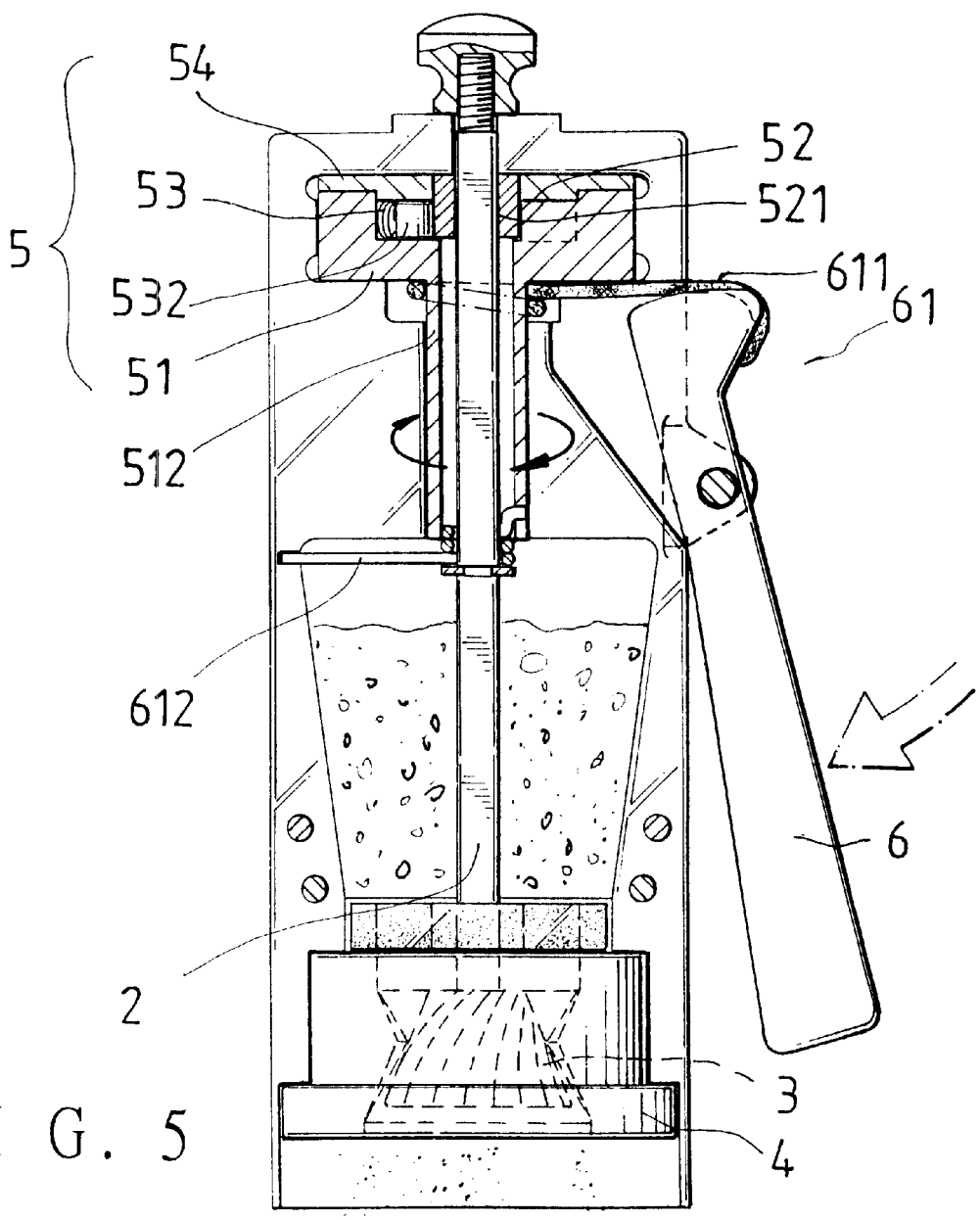
FIG. 5 is a view of the one-way pepper grinding tool of the present invention under operation.
Figures 7, 8:
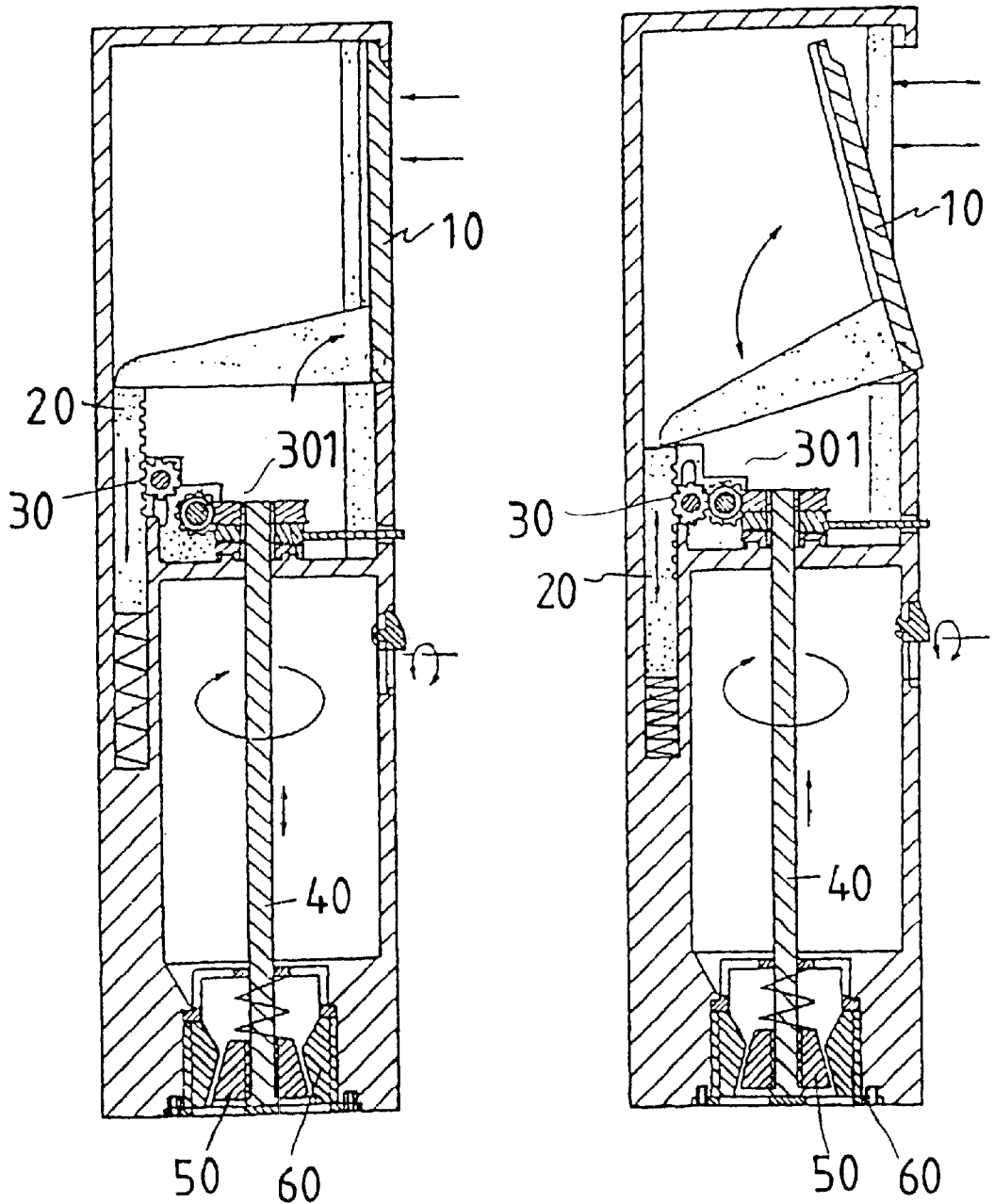
FIG. 7 is a cross-sectional view of the conventional pepper grinding tool in the Background.
FIG. 8 is a cross-sectional view of the conventional pepper grinding tool under operation.

The operation lever 6 is pivoted to the housing member 1 from an intermediate position. Referring specifically to FIG. 5, the string 611 is connected to an upper end of the operation lever 6 from one end, and connected to a lower part 512 of the main body 51 from the other end such that the main body 51 of the one-way member can be turned clockwise and counterclockwise by means of pressing, and releasing a lower portion of the operation lever 6; the torsional spring 612 for forcing the main body 51 to turn in a direction opposite the other direction of the main body 51 when the operation lever 6 is depressed.

Figure 6:
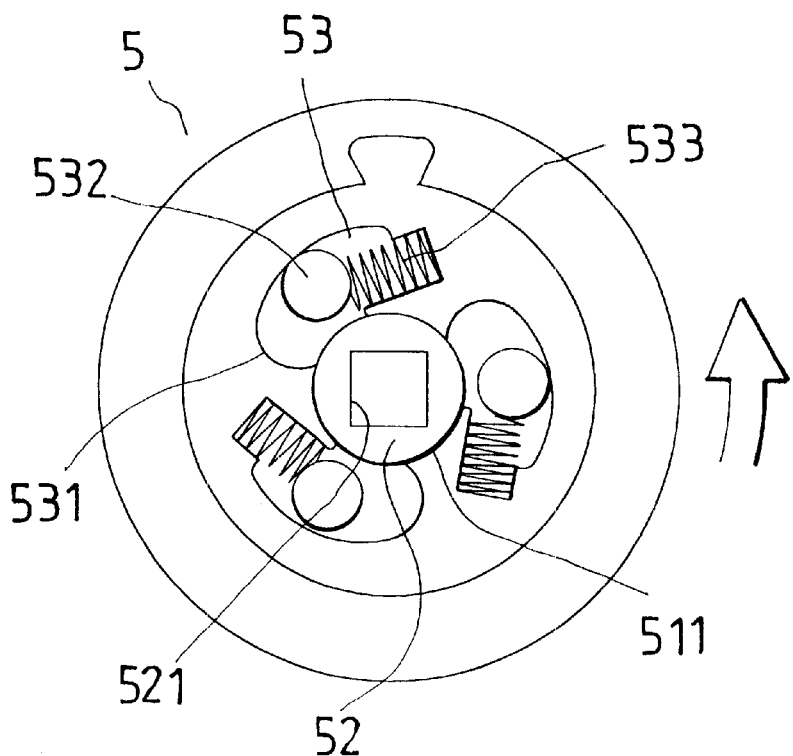
FIG. 6 is a top view of the one-way member of the pepper grinding tool being turned in a counterclockwise direction.

In using the one-way pepper grinding tool to grinding pepper, referring to FIGS. 4, 5 and 6, when the operation lever 6 is depressed from the lower portion, the string 61 is pulled, forcing the main body 51 of the one-way member 5 to turn clockwise (FIG. 4); the engaging blocks 532, being received in the engaging end portions 531 of the curved slots 53, and abutting the ring 52, will make the ring 52 turn together with the main body 51. Thus, the shaft 2 connected to the ring 52 turns for permitting the inner grinding part 3 to turn relative to the outer grinding part to grind pepper in between.

When the operation lever 6 is released, the torsional spring 612 will force the main body 51 to turn counterclockwise, making the engaging blocks 532 separate from the engaging end portions 531, and the springs 533 compressed (FIG. 6). Thus, the engaging blocks 532 no longer engage the ring 52, i.e. the ring 52 won't turn when the main body 51 is turned counterclockwise. So, the inner grinding part 3 won't turn counterclockwise in the pepper grinding operation.

When the operation lever 6 is depressed again, the engaging blocks 532 will move back to the engaging end portions 531 and engage the ring 52 for permitting the ring 52 and the inner grinding part 3 to turn.

From the above description, the one-way pepper grinding tool of the present invention can be known to have desirable features as follows.

1. Having one-way movement, the inner grinding part can have a relatively smooth movement in the pepper grinding operation.

2. The one-way pepper grinding tool can provide a stepless movement for the inner grinding part, while the conventional pepper grinding tool in the Background.

What is claimed is:

1. A one-way pepper grinding tool comprising:
   a housing member having an opening formed therethrough, said housing member including first and second cavities, said first cavity being disposed in an upper portion thereof, said second cavity being disposed in a lower portion thereof and receiving a condiment therein;

a grinding assembly received in said second cavity of said housing member and having a shaft, said shaft extending longitudinally through said opening of said housing and having first and second ends, said grinding assembly including an inner grinding part and an outer grinding part, said first end of said shaft being connected to said inner grinding part, said inner grinding part being rotatably received in said outer grinding part for pulverizing the condiment upon rotation of said inner grinding part with respect to said outer grinding part;

a one way member received in said first cavity of said housing, said one way member having a rotary main body, said rotary main body having a plurality of curved slots formed therein and a central round hole formed therethrough, a ring being rotatably received by said central round hole, said second end of said shaft being connected to said ring, said curved slots being disposed around said central round hole, each of said curved slots receiving a spring, each of said curved slots having an engaging end portion, each engaging end portion receiving an engaging block, each engaging end portion having an inner side communicating with said central round hole, each said spring biasing a respective one of said engaging blocks against said ring to rotate said ring when said rotary main body is rotated in a first direction, said engaging blocks releasing said ring responsive to said rotary main body being rotated in a second direction, said second direction being opposite said first direction;

an operation lever pivotally fixed to said housing, said operation lever being connected to said rotary main body for rotating said rotary main body in an operative direction when said operating lever is actuated;

a torsional spring having first and second ends, said first end being connected to an inner side of said housing, said second end being connected to said rotary main body, whereby said rotary main body rotates in said second direction responsive to said operational lever being released.

2. The one-way pepper grinding tool as claimed in claim 1, wherein said rotary main body includes a recessed upper side for fixedly securing a covering part, said ring, said springs and said engaging blocks.

3. The one-way pepper grinding tool as claimed in claim 1, wherein said operation lever is connected to said rotary main body by a string.

4. The one-way pepper grinding tool as claimed in claim 1, wherein said shaft includes an upper threaded end portion received by a nut.

5. The one-way pepper grinding tool as claimed in claim 1, wherein said shaft has a polygonal cross-section, said ring having a hole formed therethrough, said hole of said ring having a shape corresponding to said shaft cross-section, said shaft being passed through said hole of said ring.

* * * * *